United States Patent
Nagarajan et al.

(10) Patent No.: US 9,261,635 B2
(45) Date of Patent: Feb. 16, 2016

(54) ROTATOR EXTERNAL TO PHOTONIC INTEGRATED CIRCUIT

(75) Inventors: Radhakrishnan L. Nagarajan, Cupertino, CA (US); Masaki Kato, Palo Alto, CA (US); Jeffrey T. Rahn, Sunnyvale, CA (US); Alan C. Nilsson, Mountain View, CA (US); Kuang-Tsan Wu, Kanata (CA)

(73) Assignee: Infinera Corporation, Sunnyvale, CA (US)

(*) Notice: Subject to any disclaimer, the term of this patent is extended or adjusted under 35 U.S.C. 154(b) by 503 days.

(21) Appl. No.: 13/537,805

(22) Filed: Jun. 29, 2012

(65) Prior Publication Data

US 2014/0001347 A1    Jan. 2, 2014

(51) Int. Cl.
| | |
|---|---|
| *G02F 1/01* | (2006.01) |
| *G02B 5/30* | (2006.01) |
| *G02B 5/32* | (2006.01) |
| *G01J 1/04* | (2006.01) |
| *H04J 14/06* | (2006.01) |
| *G02B 6/12* | (2006.01) |
| *G02B 6/126* | (2006.01) |
| *G01J 1/42* | (2006.01) |
| *H04J 14/02* | (2006.01) |

(52) U.S. Cl.
CPC ............... *G02B 5/30* (2013.01); *G01J 1/0425* (2013.01); *G01J 1/0429* (2013.01); *G01J 1/4228* (2013.01); *G02B 5/32* (2013.01); *G02B 6/126* (2013.01); *G02B 6/12007* (2013.01); *H04J 14/02* (2013.01); *H04J 14/06* (2013.01); *G02B 6/12019* (2013.01); *H04J 14/0279* (2013.01)

(58) Field of Classification Search
CPC ......... G01J 1/0429; G01J 1/4228; G01J 1/04; G02B 5/30; G02B 5/32; G02B 6/126; G02B 6/12019
USPC ........... 250/225; 359/489.07, 492.01; 398/65; 356/369, 477; 385/11
See application file for complete search history.

(56) References Cited

U.S. PATENT DOCUMENTS

| | | | | |
|---|---|---|---|---|
| 5,742,418 | A * | 4/1998 | Mizutani et al. .............. | 398/184 |
| 2007/0296977 | A1 * | 12/2007 | Madsen ....................... | 356/477 |
| 2008/0278811 | A1 * | 11/2008 | Perkins et al. ................ | 359/486 |
| 2010/0322629 | A1 * | 12/2010 | Nagarajan et al. ............. | 398/65 |
| 2013/0094087 | A1 * | 4/2013 | Song et al. .................... | 359/578 |
| 2013/0188971 | A1 * | 7/2013 | Painchaud ........... | H04B 10/612 398/214 |

* cited by examiner

*Primary Examiner* — Georgia Y Epps
*Assistant Examiner* — Kevin Wyatt
(74) *Attorney, Agent, or Firm* — Harrity & Harrity LLP; David L. Soltz

(57) ABSTRACT

An optical system may include a polarization beam splitter having an input that receives multiple optical signals, a first output and a second output. The first output may provide components of the multiple optical signals having a first polarization. The second output may provide components of the multiple optical signals having a second polarization. The optical system may include a rotator having an input that receives the components to rotate the first polarization such that each of the components has the second polarization, and an output to supply components as rotated components.
The optical system may also include an optical circuit including a substrate. The rotator may be separate from the substrate. The optical circuit may include an optical demultiplexer circuit provided on the substrate to receive the rotated components and the components.

27 Claims, 10 Drawing Sheets

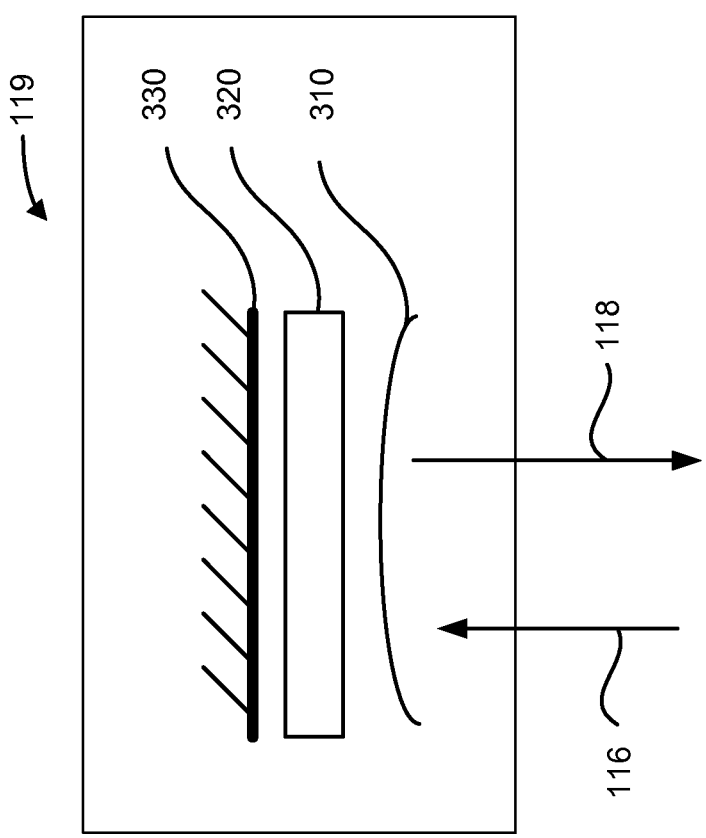

ROTATOR EXTERNAL TO PHOTONIC INTEGRATED CIRCUIT

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component to provide a laser associated with each wavelength, a modulator configured to modulate the output of the laser, and multiplexer to combine each of the modulated outputs (e.g., to form a combined output).

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, and various polymers and semiconductor materials which are used to make semiconductor lasers, such as GaAs, InP and their alloys.

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel "grid" for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In WDM systems, the demultiplexer may be capable of receiving first and second optical signals associated with the combined output in order to increase data rates associated with the WDM system. In order to further increase the data rates associated with a WDM system, additional WDM components are sometimes incorporated. For example, some WDM systems may include a polarization beam splitter (PBS) to receive the combined output and output first and second optical signals, to increase the data rates associated with the WDM system. The first optical signal may include components having a first polarization and the second optical signal may include components having a second polarization. Some WDM systems may further include a rotator to rotate the polarization of the components associated with the first optical signal such that the components have the second polarization, thereby allowing the demultiplexer to process optical signals associated with one polarization (e.g., the second polarization).

WDM systems are sometimes constructed from discrete components (e.g., a transmitter component, a multiplexer, a demultiplexer, a PBS, a rotator, and/or a receiver component). For example, demultiplexers and receiver components may be packaged separately and provided on a printed circuit board. Alternatively, WDM components are sometimes integrated onto a single chip, also referred to as a photonic integrated circuit (PIC). For example, a PBS and a rotator are provided on the same PIC as a demultiplexer.

SUMMARY

According to one example implementation, an optical system may include a polarization beam splitter having an input that receives multiple optical signals. Each of the multiple optical signals may include a corresponding one of multiple wavelengths. The polarization beam splitter may include a first output and a second output. The first output may provide components of the multiple optical signals. Each of the components may have a first polarization. The second output may provide components of the multiple optical signals. Each of the components may have a second polarization. The optical system may include a rotator having an input that receives the components. The rotator may rotate the first polarization such that each of the components has the second polarization. The rotator may output the components as rotated components.

The optical system may also include an optical circuit including a substrate. The rotator may be separate from the substrate. The optical circuit may include a first path and a second path provided on the substrate. The first path may receive the rotated components and the second path may receive the components.

The optical circuit may include an optical demultiplexer circuit provided on the substrate, such that the first path may provide the rotated components to the optical demultiplexer circuit and the second path may provide the components to the optical demultiplexer circuit. The optical demultiplexer circuit may include multiple outputs, such that each of first ones of the multiple outputs supply a respective one of the rotated components, and each of second ones of the multiple outputs supply a respective one of the components.

According to another example implementation, an optical system may include multiple polarization beam splitters, such that each polarization beam splitter may have an input that receives multiple optical signals. Each of the multiple optical signals may include a corresponding one of multiple wavelengths. The polarization beam splitters may each include a first output and a second output. The first output may provide components of the multiple optical signals. Each of the components may have a first polarization. The second output may provide components of the multiple optical signals. Each of the components may have a second polarization. The optical system may include a rotator having multiple inputs, such that each input receives corresponding components associated with the multiple optical signals. The rotator may rotate the first polarization such that each of the components has the second polarization. The rotator may output the components as rotated components.

The optical system may include an optical circuit including a substrate. The rotator may be separate from the substrate. The optical circuit may include multiple first paths and multiple second paths provided on the substrate. The multiple first paths may receive a respective one of the rotated components and the multiple second paths may receive a respective one of the components.

The optical circuit may include an optical demultiplexer circuit provided on the substrate, such that the multiple first paths may provide the rotated components to the optical demultiplexer circuit and the multiple second paths may provide the components to the optical demultiplexer circuit. The optical demultiplexer circuit may include multiple outputs, such that each of first ones of the multiple outputs supply a respective one of the rotated components, and each of second ones of the multiple outputs supply a respective one of the components.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 is a diagram illustrating example components of a rotator shown in FIG. 1;

DETAILED DESCRIPTION

Figure 1A:
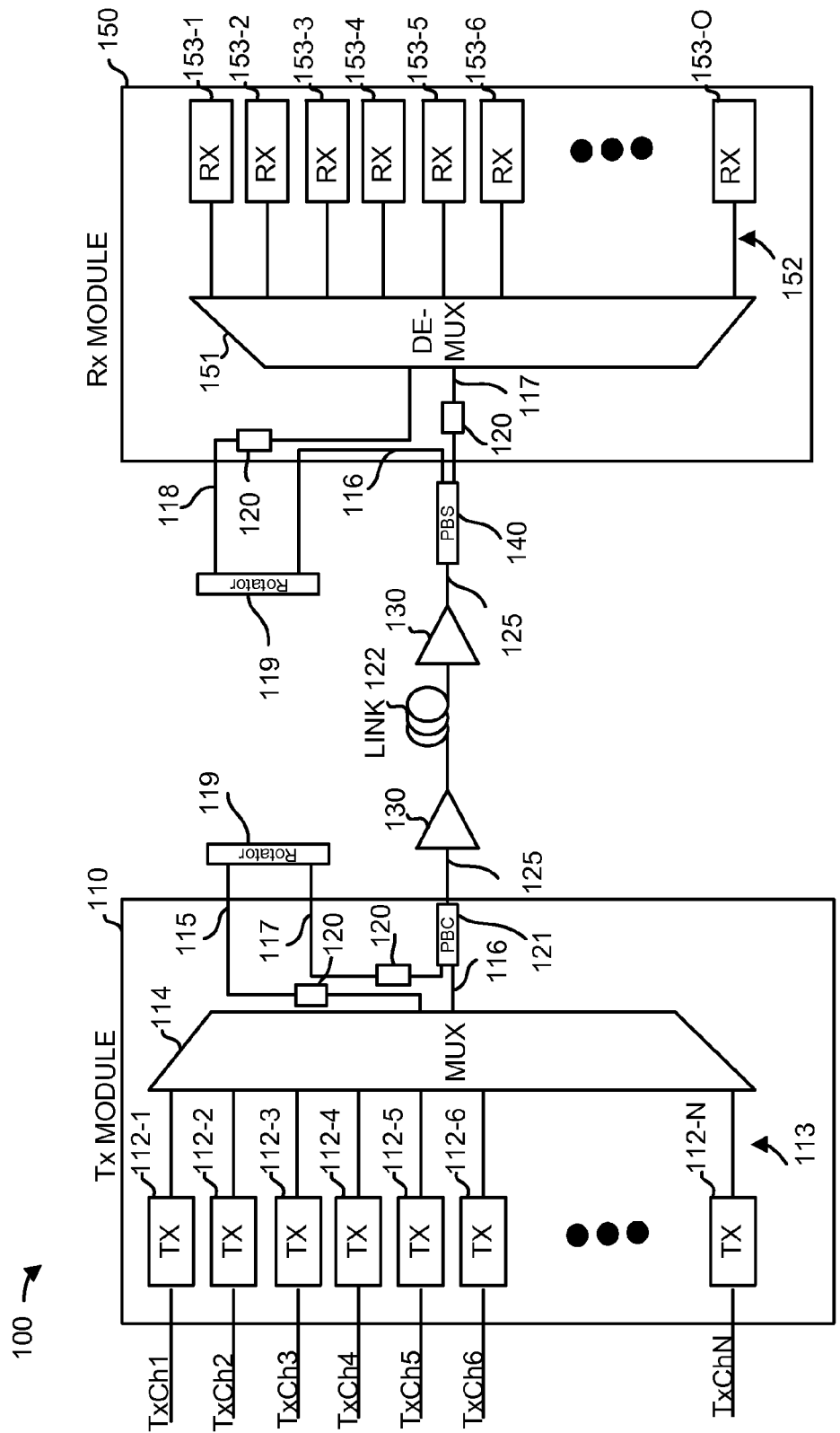
FIGS. 1A-1B are diagrams of an example network in which systems and/or methods may be implemented.

The following detailed description refers to the accompanying drawings. The same reference numbers in different drawings may identify the same or similar elements. Also, the following detailed description does not limit the disclosure.

Implementations described herein may provide a WDM system with a rotator provided external to a transmitter or receiver circuit (e.g., a transmitter PIC or receiver PIC) associated with the WDM system. In some implementations, providing the rotator separate from the transmitter PIC or the receiver PIC may allow the rotator to receive multiple sets of components associated with multiple optical signals, and to rotate a polarization associated with each one of the multiple sets of components (e.g., components supplied by multiple PBSs or some other source) to form rotated components. As a result, a single rotator may supply multiple sets of rotated components to one or more optical devices (e.g., optical multiplexers, optical demultiplexers, and/or optical receivers) associated with the WDM system.

For example, assume that a WDM system includes a PBS that receives an input optical signal (e.g., a modulated output from an optical multiplexer, and/or some other source), and supplies output optical signals having components and components (e.g., via a first output and/or a second output). The components and the components may be associated with different polarizations (e.g., the components outputted by the PBS may be associated with a first polarization, such as a Transverse Magnetic (TM) polarization, while the components outputted by the PBS may be associated with a second polarization, such as a Transverse Electric (TE) polarization).

In some implementations, the WDM system may include a rotator to rotate the polarization associated with the components to form rotated components, such that the rotated components have the second polarization. The rotator may supply the rotated components to an optical demultiplexer and the PBS may supply the components to the optical demultiplexer. As a result, the optical demultiplexer receives components having the same polarization (e.g., the second polarization). In some implementations, the construction of the optical demultiplexer may be simplified when the optical demultiplexer receives components having the same polarization. Additionally, the optical demultiplexer may output signals with components having one polarization based on receiving components with one polarization. In some implementations, it may be desirable to output signals having the same polarization in order to match the polarization of a local oscillator, associated with the WDM system, thereby improving the performance of the local oscillator.

While implementations may be described in terms of the TM polarization as the first polarization and the TE polarization as the second polarization, it will be apparent that the first polarization may be the TE polarization and the second polarization may be the TM polarization.

In some implementations, the rotator may rotate the polarization associated with multiple sets of components. For example, some implementations may include multiple PBSs, such that each PBS supplies a first set of components and a second set of components. Providing the rotator separate from the receiver PIC, for example, may allow a single rotator to rotate the polarization associated with multiple sets of components supplied by multiple PBSs. As a result, a single rotator may supply multiple sets of rotated components to one or more optical demultiplexers.

While the implementations described herein may be described as providing rotated components to an optical demultiplexer associated with a receiver circuit, in practice, the implementations are not so limited. For example, some implementations may provide rotated components to an optical multiplexer associated with a transmitter circuit in addition to, or instead of, providing rotated components to an optical demultiplexer associated with a receiver circuit.

Figure 1B:
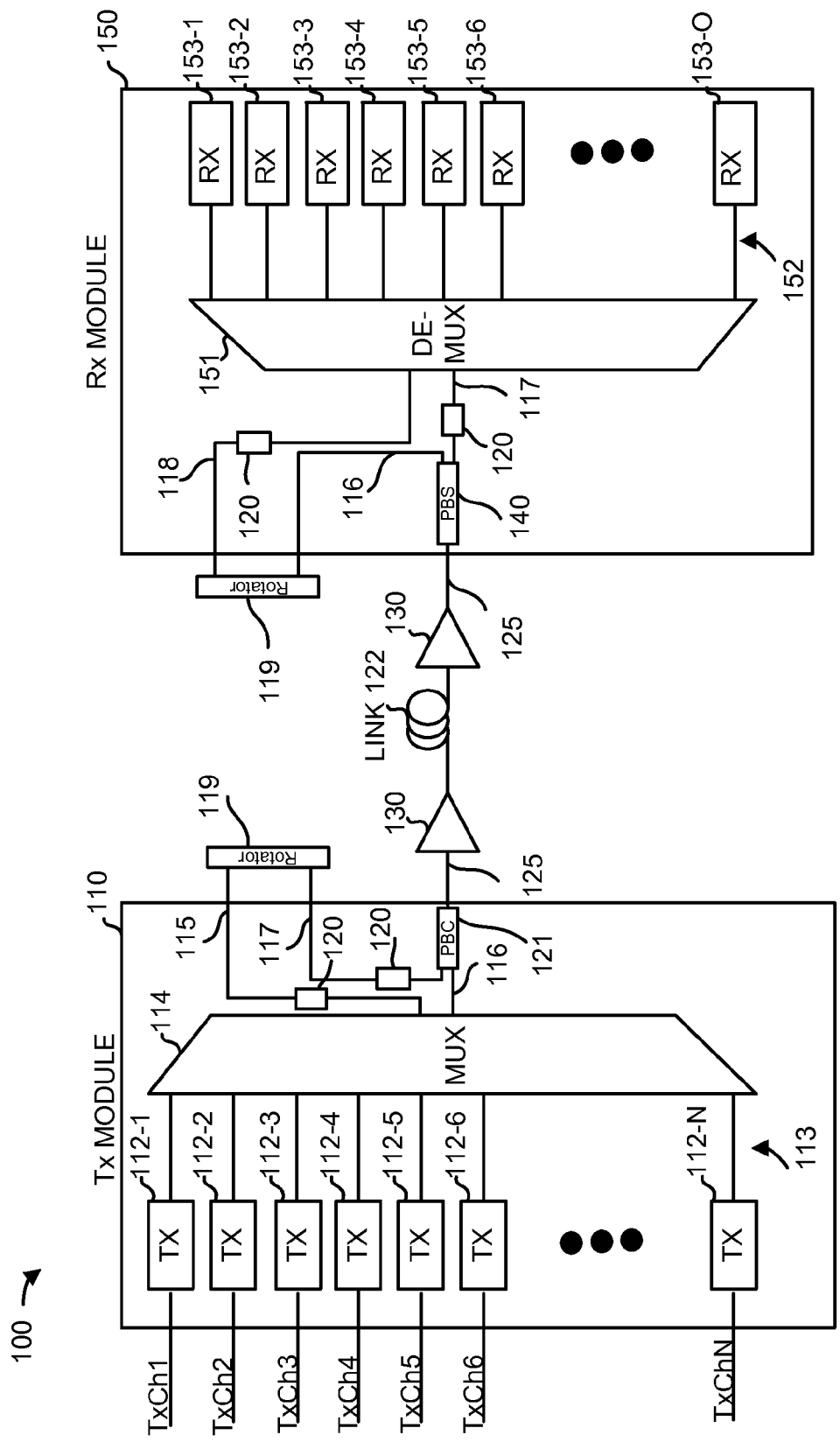

FIGS. 1A-1B are diagrams of an example network 100 in which systems and/or methods described herein may be implemented. In practice, network 100 may include additional, fewer, or differently arranged components than shown in FIGS. 1A-1B.

As illustrated in FIG. 1A, network 100 may include transmitter (Tx) module 110 (e.g., a Tx PIC), rotators 119, polarizers 120, polarization beam combiner (PBC) 121, PBS 140, and/or receiver (Rx) module 150 (e.g., an Rx PIC). In some implementations, transmitter module 110 may be optically connected to receiver module 150 via link 122, optical amplifiers 130, and/or PBS 140. Link 122 may include one or more optical amplifiers 130 that amplify an optical signal as the optical signal is transmitted over link 122.

Transmitter module 110 may include a number of optical transmitters 112-1 through 112-N (where N≥1), waveguides 113, optical multiplexer 114, polarizers 120, and/or polarization beam combiner (PBC) 121. Each optical transmitter 112 may receive a data channel (TxCh1 through TxChN), modulate the data channel with an optical signal, and transmit the data channel as an optical signal. In one implementation, transmitter module 110 may include 5, 10, 20, 50, 100, or some other number of optical transmitters 112. Each optical transmitter 112 may be tuned to use an optical carrier of a designated wavelength. It may be desirable that the grid of wavelengths emitted by optical transmitters 112 conform to a known standard, such as a standard published by the Telecommunication Standardization Sector (ITU-T).

In some implementations, each of optical transmitters 112 may include a laser, a modulator, a semiconductor optical amplifier (SOA), and/or some other components. The laser, modulator, and/or SOA may be coupled with a tuning element that can be used to tune the wavelength of the optical signal channel by the laser, modulator, or SOA. In some implementations, a single laser may be shared by multiple optical transmitters 112.

Waveguides 113 may include an optical link or some other link to transmit modulated outputs (referred to as "signal channels") of optical transmitters 112. In some implementations, each optical transmitter 112 may connect to one waveguide 113 or to multiple waveguides 113 to transmit signal channels of optical transmitters 112 to optical multiplexer 114.

Optical multiplexer 114 may include an arrayed waveguide grating (AWG) or some other multiplexing device. In some implementations, optical multiplexer 114 may combine multiple signal channels, associated with optical transmitters 112, into wave division multiplexed (WDM) signals, such as optical signals 115 and 116. In some implementations, optical multiplexer 114 may include an input, (e.g., a first slab to receive signal channels) and an output (e.g., a second slab to supply WDM signals, such as optical signals 115 and 116, associated with input signal channels). Optical multiplexer 114 may also include waveguides connecting the input and the output. In some implementations, the first slab and the second slab may each act as an input and an output. For example, the first slab and the second slab may each receive multiple signal channels. The first slab may supply a single WDM signal corresponding to the signal channels received by the second slab. The second slab may supply a single optical signal (e.g., a WDM signal) corresponding to the signal channels received by the first slab. As shown in FIG. 1A, optical multiplexer 114 may receive signal channels outputted by optical transmitters 112, and output optical signals 115 and 116. Optical signals 115 and 116 may each include one or more optical signals, such that each optical signal includes one or more wavelengths.

Rotator 119 may include an optical device or a collection of optical devices. In some implementations, rotator 119 may receive an optical signal with components having a first polarization (e.g., a TM polarization), rotate the polarization of the components, associated with the optical signal, and supply an optical signal with rotated components having a second polarization (e.g., a TE polarization). In some implementations, rotator 119 may be associated with transmitter module 110. Rotator 119 may receive components associated with optical signal 115 having a first polarization (e.g., a TM polarization), and supply optical signal 117 with rotated components having a second polarization (e.g., a TE polarization). As shown in FIG. 1A, rotator 119 may supply optical signal 117 to PBC 121.

Additionally, or alternatively, rotator 119 may be associated with receiver module 150 and may receive components associated with optical signal 116 having a first polarization (e.g., a TM polarization), and supply optical signal 118 with rotated components having a second polarization (e.g., a TE polarization). As shown in FIG. 1A, rotator 119 may supply optical signal 118 to optical demultiplexer 151.

As described above, rotator 119 may be capable of receiving multiple sets of components associated with multiple optical signals and supplying multiple sets of rotated components associated with the received components. As shown in FIG. 1A, rotator 119 may be located separate and/or detached from receiver module 150. Similarly, 119 may be located separate and/or detached from transmitter module 110.

Polarizer 120 may include an optical device, or a collection of optical devices. In some implementations, polarizer 120 may receive an optical signal, and may absorb components of the optical signal having a particular polarization such as a first polarization (e.g., a TM polarization) or a second polarization (e.g., a TE polarization). In some implementations, polarizers 120 may be associated with transmit module 110 and may receive optical signal 115 supplied by optical multiplexer 114 and/or optical signal 117 supplied by rotator 119.

In some implementations, polarizers 120 may absorb residual components of optical signal 117 having the first polarization. For example, as described above rotator 119 may rotate components associated with optical signal 115 having the first polarization, to supply optical signal 117 with components having the second polarization. Optical signal 117 may include residual components associated with the first polarization. Polarizer 120 may be connected along a path associated with optical signal 117 to absorb the residual components associated with the first polarization, thereby absorbing components having an undesirable polarization. Similarly, polarizer 120 may be connected along a path associated with optical signal 115 to absorb components having an undesirable polarization.

Additionally, or alternatively, polarizers 120 may be associated with receiver module 150 and may receive optical signal 117 supplied by PBS 140 and/or optical signal 118 supplied by rotator 119. In a similar manner as described above, polarizers 120 may absorb components of optical signal 118 having the first polarization (e.g., residual components of optical signal 118 having the first polarization when rotator 119 supplies optical signal 118). Similarly, polarizer 120 may be connected along a path associated with optical signal 117 to absorb components having an undesirable polarization.

PBC 121 may include an optical device, or a collection of optical devices. In some implementations, PBC 121 may receive multiple optical signals and supply a combined optical signal (e.g., a WDM signal, or some other type of optical signal). For example, as shown in FIG. 1A, PBC 121 may receive optical signal 116 and optical signal 117. PBC 121 may supply optical signal 125 based on receiving optical signals 116 and 117. In some implementations, optical signal 125 may include a combined WDM signal associated with optical signals 116 and/or 117.

PBS 140 may include an optical device or a collection of optical devices. In some implementations, PBS 140 may receive an input optical signal (e.g., optical signal 125 or some other signal), and supply output components associated with the input optical signal (e.g., via a first output and/or a second output of PBS 140). As shown in FIG. 1A, PBS 140 may receive optical signal 125 supplied by PBC 121 (e.g., via link 122). PBS 140 may supply components, associated with optical signal 125, (e.g., via a first output and a second output), such as components associated with optical signal 116 (referred to as "first components 116"), and/or components associated with optical signal 117 (referred to as "second components 117"). In some implementations, PBS 140 may supply first components 116 to rotator 119, and supply second components 117 to optical demultiplexer 151. First components 116 may be associated with a first polarization (e.g., a TM polarization) while second components 117 may be associated with a second polarization (e.g., a TE polarization).

As further shown in FIG. 1A, receiver module 150 may include polarizers 120, optical demultiplexer 151, waveguides 152, and/or optical receivers 153-1 through 153-O (where O≥1). In some implementations, optical demultiplexer 151 may include an AWG or some other device. Optical demultiplexer 151 may supply multiple signal channels based on receiving a WDM signal (e.g., optical signal 125), or components associated with the WDM signal. For example, optical demultiplexer 151 may include an input (e.g., a first slab region to receive second components 117, optical signal 118 (referred to as "rotated components 118"), and/or some other input component), and an output (e.g., a second slab region to supply multiple signal channels associated with the input). Optical demultiplexer 151 may include waveguides connecting the input and the output. In some implementations, the first slab and the second slab may each act as an input and an output. For example, the first slab and the second slab may each receive components associated with a WDM signal. The first slab may supply signal channels corresponding to the components received by the second slab. The second slab my supply signal channels corresponding to the components received by the first slab. As shown in FIG. 1A, optical demultiplexer 151 may supply signal channels to optical receivers 152 via waveguides 152.

Waveguides 152 may include optical links or some other links to transmit outputs of optical demultiplexer 151 to optical receivers 153. In some implementations, each optical receiver 153 may receive outputs via a single waveguide 152 or via multiple waveguides 152.

Optical receivers 153 may each operate to convert the input optical signal to an electrical signal that represents the transmitted data. In some implementations, optical receivers 153 may each include one or more photodetectors and/or related devices to receive respective input optical signals outputted by optical demultiplexer 151 and a local oscillator, convert the signals to a photocurrent, and provide a voltage output to function as an electrical signal representation of the original input signal.

In some implementations, and as shown in FIG. 1B, PBS 140 may be located on receiver module 150. As a result, transmitter module 110 may supply optical signal 125 to receiver module 150, via link 122 and/or amplifiers 130. PBS 140 may receive optical signal 125, and may supply first components 116, to rotator 119, along a first path on receiver module 150, and second components 117, to optical demultiplexer 151, along a second path on receiver module 150.

Figure 2A:
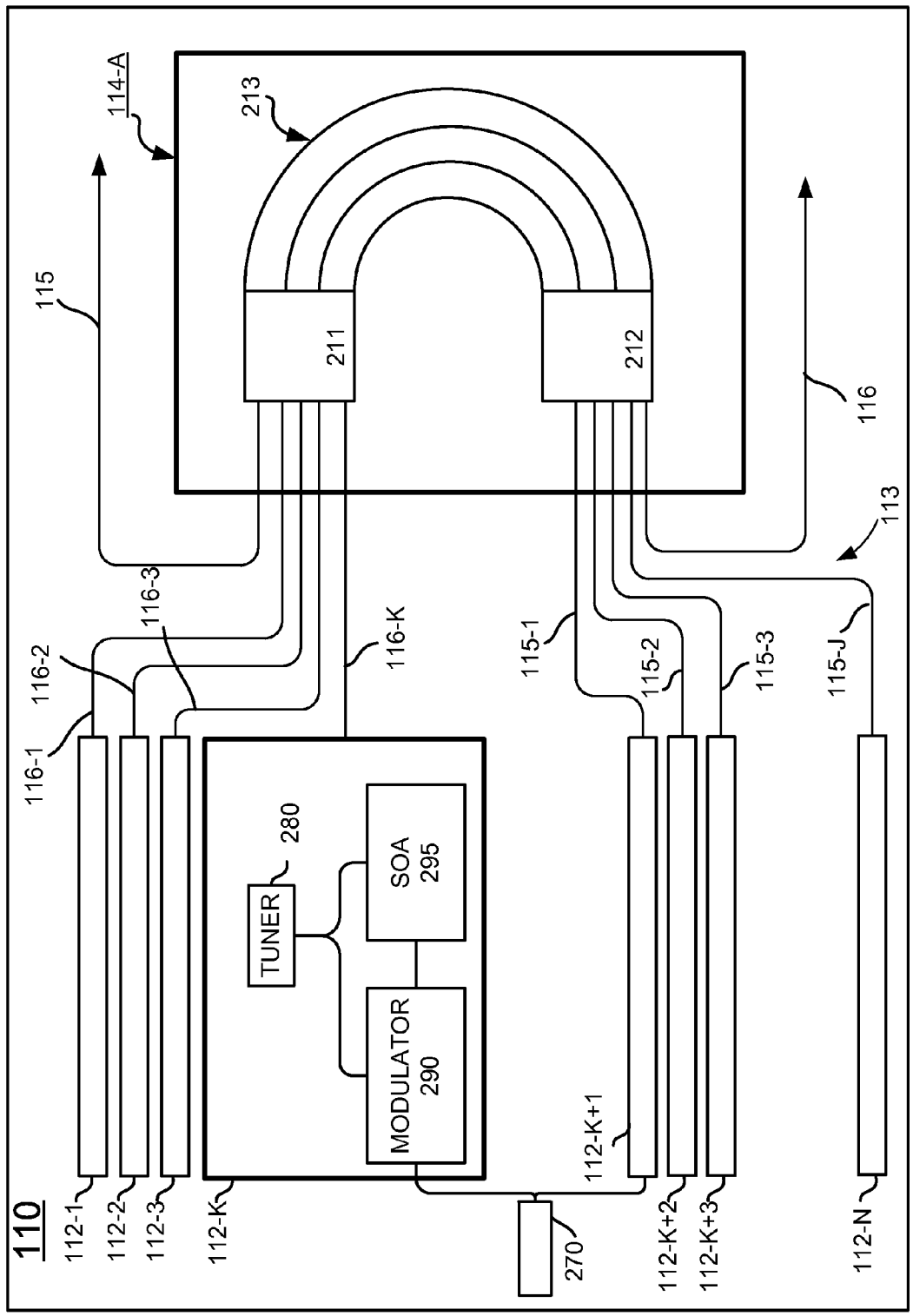
FIG. 2A are diagrams illustrating example components of a transmitter module shown in FIG. 1.

FIG. 2A is a diagram illustrating example elements of transmitter module 110 shown in network 100 of FIGS. 1A-1B. In practice, the example implementations of transmitter module 110, shown in FIG. 2A, may include additional, fewer, or differently arranged elements than are shown in FIG. 2A.

As shown in FIG. 2A, transmitter module 110 may include optical transmitters 112, waveguides 113, and optical multiplexer 114. As described above, optical transmitters 112 may include laser 270, tuner 280, modulator 290, and/or SOA 295.

Laser 270 may include a semiconductor laser, such as a distributed feedback (DFB) laser, or some other type of laser. Laser 270 may provide an output optical light beam to modulator 290. In some implementations, laser 270 may be an optical source for a single corresponding optical transmitter 112. In some implementations, laser 270 may be an optical source that is shared by multiple optical transmitters 112.

Tuner 280 may include a tuning device, or a collection of tuning devices. In some implementations, laser 270, modulator 290, and/or SOA 295 may be coupled with tuner 280 such that tuner 280 may tune a wavelength of an optical signal channel associated with laser 270, modulator 290, or SOA 295.

Modulator 290 may include an optical modulator such as an electro-absorption modulator (EAM), or some other type of modulator. Modulator 290 may control (modulate) the intensity of an input optical light beam (e.g., supplied by laser 270), based on an input voltage signal (e.g., signals provided over TxCh1 through TxChN). Modulator 290 may be formed as a waveguide with electrodes for applying an electric field, based on the input voltage signal, in a direction perpendicular to the light beam. Alternatively, modulator 290 may be implemented based on other modulation technologies, such as electro-optic modulation.

SOA 295 may include an amplifying device, or a collection of amplifying devices. In some implementations, SOA 295 may include an amplifier that may directly amplify an input optical signal (e.g., a signal supplied by laser 270). In some implementations, SOA 295 may be replaced by a variable optical attenuator (VOA), or by an element that combines both an SOA and a VOA.

Slabs 211 and 212 may each include a free-space region (e.g., a propagation region). The free-space regions of slabs 211 and 212 may allow the wavelengths, associated with input optical signals (e.g., signal channels received by optical transmitters 112-1 through 112-N), to propagate freely. Slab 211 may receive signal channels 112-1 through 112-K (where K≥1), thereby allowing the received signal channels to propagate in the free-space region of slab 211. Waveguides 213 may supply slab 211 with a combined WDM signal (e.g., optical signal 115) associated with the inputs of slab 212. Further, waveguides 213 may supply slab 212 with a combined WDM signal (e.g., optical signal 116) associated with the inputs of slab 211.

Waveguides 113 may include individual waveguides associated with individual signal channels outputted by optical transmitters 112. For example, waveguides 113 may include corresponding waveguides to transmit signal channels 116-1, 116-2, 116-3 . . . 116-K (where K≥1) supplied by optical transmitters 112-1, 112-2, 112-3 . . . 112-K, respectively. Further, waveguides 113 may include corresponding waveguides to transmit signal channels 115-1, 115-2, 115-3 . . . 115-J (where J≥1) supplied by optical transmitters 112-K+1, 112-K+2, 112-K+3 . . . 112-N).

Figure 2B:
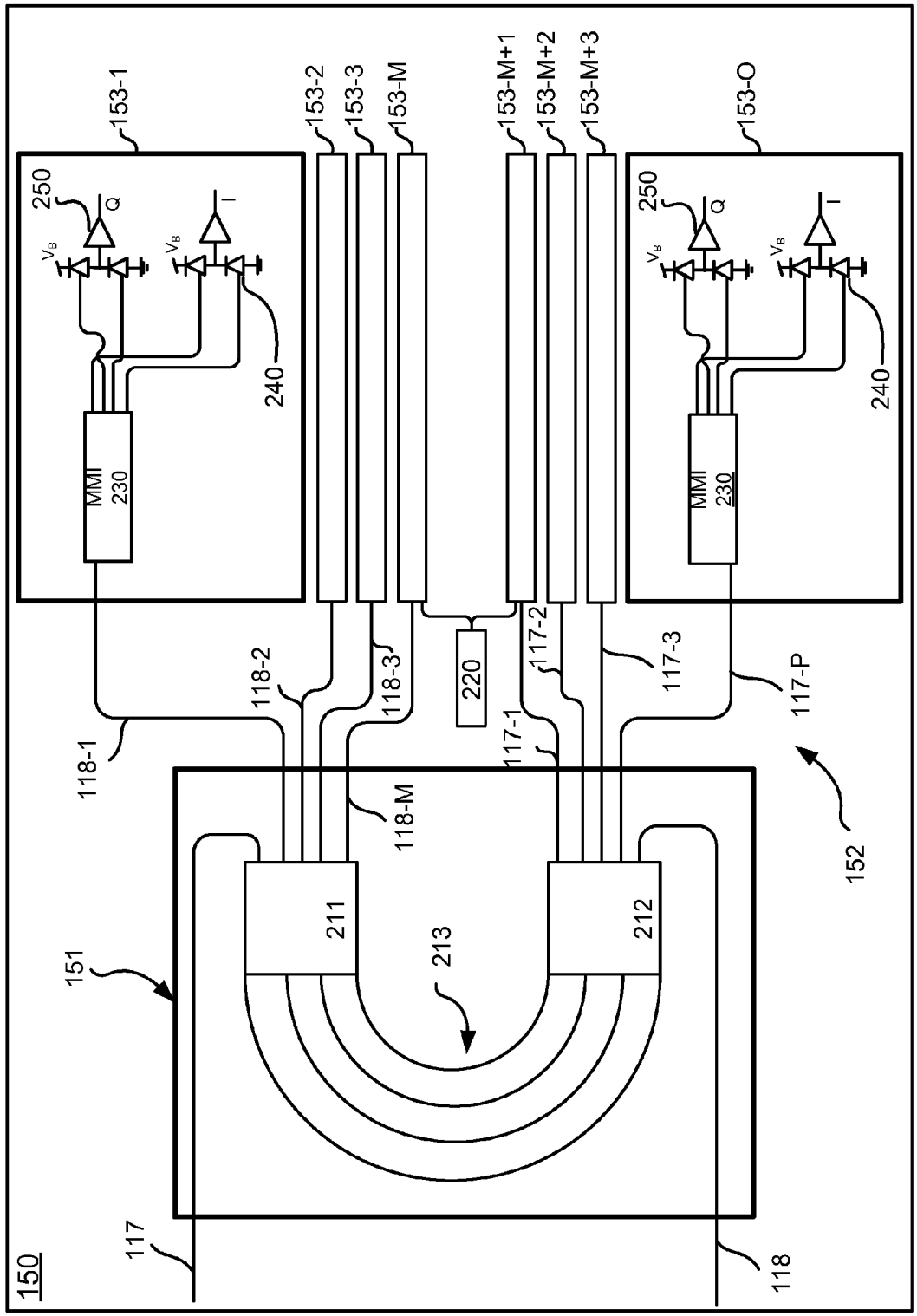
FIGS. 2B-2C are diagrams illustrating example components of a receiver module shown in FIG. 1.
Figure 2C:
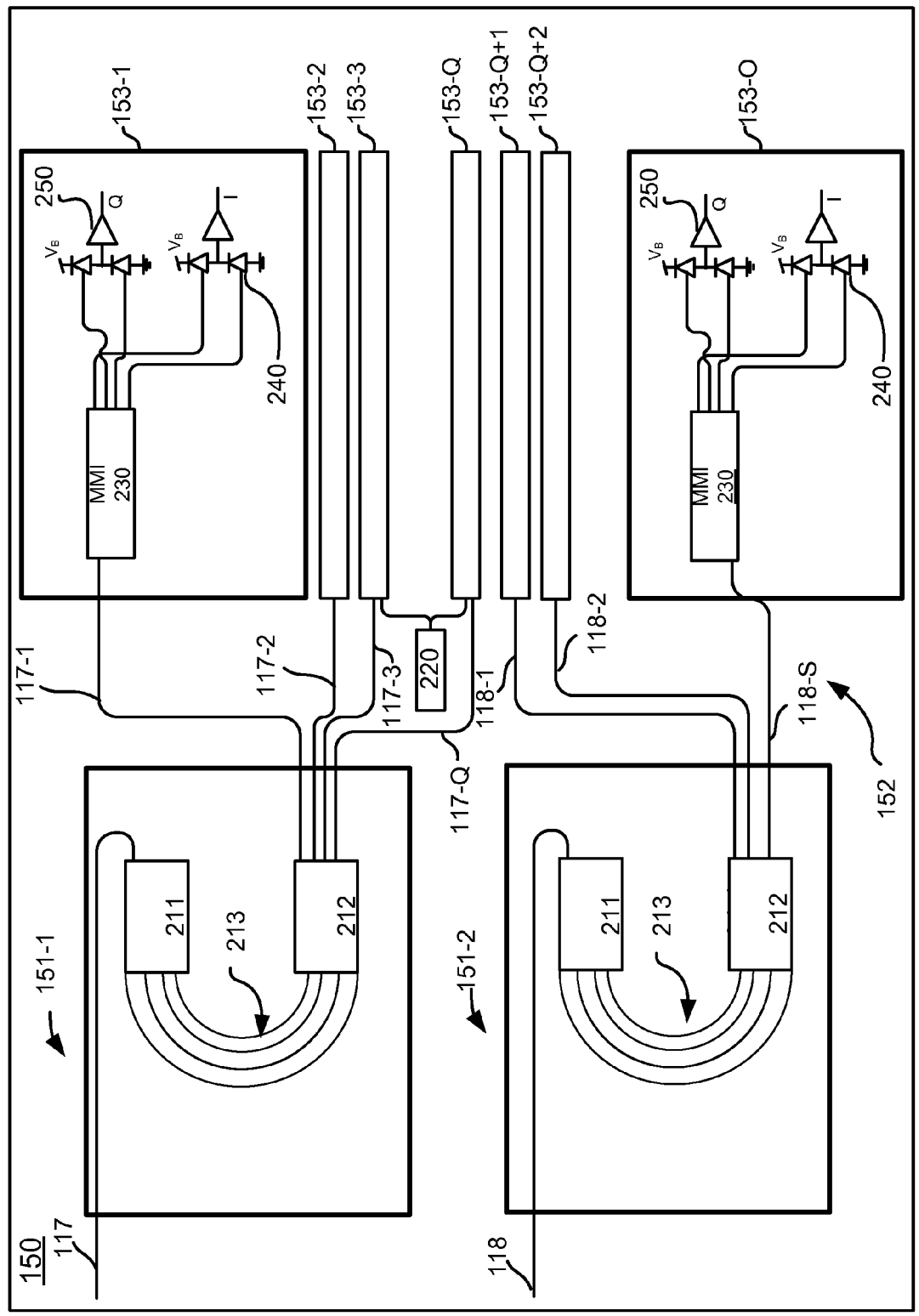

FIGS. 2B-2C are diagrams illustrating receiver module 150 shown in network 100 of FIGS. 1A-1B. In practice, the example implementations of receiver module 150, shown in FIGS. 2A-2B, may include additional, fewer, or differently arranged elements than are shown in FIGS. 2A-2B.

As shown in FIG. 2B, receiver module 150 may include optical demultiplexer 151, waveguides 152, local oscillator 220, and/or optical receivers 153. Optical demultiplexer 151 may include slab 211, slab 212, and one or more waveguides 213 connected to slabs 211 and 212. In some implementations, slabs 211 and 212 may include an input and an output. For example, slab 211 may receive an input (e.g., second components 117) and slab 212 may receive an input (e.g., rotated components 118). Waveguides 213 may supply slab 211 with output signal channels associated with the input of slab 212. Further, waveguides 213 may supply slab 212 with output signal channels associated with the input of slab 211.

Slabs 211 and 212 may each include a free-space region (e.g., a propagation region). The free-space regions of slabs 211 and 212 may allow the wavelengths, associated with input optical signals, to propagate freely. Slab 211 may receive second components 117, thereby allowing second components 117 to propagate in the free-space region of slab 211. Waveguides 213 may guide individual signal channels associated with second components 117 and supply the individual signal channels that may be outputted by slab 212. Slab 212 may also receive rotated components 118, thereby allowing rotated components 118 to propagate in the free-space region of slab 212. Waveguides 213 may guide individual signal channels associated with rotated components 118 and supply the individual signal channels that may be outputted by slab 211.

As shown in FIG. 2B, slabs 211 and 212 may supply respective signal channels to optical receivers 153, via waveguides 152. Waveguides 152 may include individual waveguides associated with individual signal channels outputted by slabs 211 and 212. For example, waveguides 117-1, 117-2, 117-3, and 117-P (where P≥1) may guide individual signal channels associated with second components 117 to optical receivers 153-M+1, 153-M+2, 153-M+3, 153-O, (where O≥1), respectively. Additionally, waveguides 152 may include individual waveguides associated with individual signal channels associated with rotated components 118. For example, waveguides 118-1, 118-2, 118-3, and 118-M may guide individual signal channels associated with rotated components 118 to optical receivers 153-1, 153-2, 153-3, and 153-M, respectively.

Local oscillator 220 may include a laser, a collection of lasers, or some other device. In some implementations, local oscillator 220 may include a laser to provide an optical signal to optical receivers 153. In some implementations, local oscillator 220 may include a single-sided laser to provide an optical signal to a coupler. In some other implementations, local oscillator 220 may include a double-sided laser to provide optical signals to respective optical receivers 153. Receiver module 120 may include multiple local oscillators 220, to provide optical signals to respective optical receivers 153.

Local oscillator 220 may provide a coherent detection system for optical receivers 153 (e.g., to allow optical receivers 153 to reconstruct a received optical signal having crosstalk or dispersion). For example, local oscillator may provide optical receiver 153-M with a phase reference signal, such that optical receiver 153-M may reconstruct a received signal (e.g., signal channel 118-M supplied by optical demultiplexer 151) that may include linear crosstalk and/or dispersion.

As further shown in FIG. 2B, optical receivers 153 may each include multi-mode interference (MMI) coupler 230, photodiodes 240, and transimpedence amplifiers (TIAs) 250. Additionally, or alternatively, optical receivers 153 may include additional, fewer, or different arranged components than are shown in FIG. 2B.

MMI coupler 230 may include an optical device to receive a signal channel supplied by optical demultiplexer 151 and/or an optical signal from local oscillator 220. In some implementations, MMI coupler 230 may supply multiple signals associated with the received signal channel and optical signal to photodiodes 240.

Photodiodes 240 may receive optical outputs from MMI coupler 230 and convert the optical outputs to corresponding electrical signals. In some implementations, photodiodes 240 may be arranged in pairs and connected to one another in a balanced configuration. The output of each balanced pair may supply one of a quadrature (Q) or in-phase (I) electrical signal, which is amplified by one of TIAs 250.

In some other implementations, multiple optical demultiplexers 151 may receive respective sets of input components, such as second components 117 and/or rotated components 118. For example, as shown in FIG. 2C, first optical demultiplexer 151-1 may receive second components 117 and output individual signal channels via waveguides 117-1 to 117-Q (where Q≥1) to receivers 153 in manner as described above. Second optical demultiplexer 151-2 may receive rotated components 118 and output individual signal channels via waveguides 118-1 to 118-S (where S≥1) to optical receivers 153.

FIG. 3 is a diagram illustrating example elements of rotator 119 as shown in FIGS. 1A-1B. In practice, rotator 119 may include additional, fewer, or differently arranged elements than are shown in FIG. 3. In some implementations, rotator 119 may include lens 310, wave plate 320, and/or mirror 330.

Lens 310 may include a collimating lens, or some other type of lens. In some implementations, first components 116 may pass through lens 310 when first components 116 are supplied to rotator 119. Lens 310 may cause first components 116 to travel along a desired path (e.g., a path connected to rotator 119). Additionally, lens 310 may cause components 118 to travel along a desired path (e.g., a path to optical demultiplexer 151) when rotator 119 forms rotated components 118.

Wave plate 320 may include a plate having a birefringent material (e.g. a birefringent crystal) to create a phase shift associated with components of an incoming signal (e.g., first components 116). Wave plate 320 may include a quarter-wave plate (e.g., a wave plate configured to create a quarter-wavelength phase shift), a half-wave plate (e.g., a wave plate configured to create a half-wavelength phase shift), and/or some other type of wave plate. In some implementations, wave plate 320 may receive first components 116 and rotate the polarization associated with first components 116 to form rotated components 118. Wave plate 320 may supply rotated components 118 to mirror 310.

Mirror 310 may include a reflecting device to reflect rotated components 118 along a desired path (e.g., a path connected to optical demultiplexer 151 or some other path). For example, mirror 310 may reflect rotated components 118 supplied by wave plate 320 and pass rotated components 118 back through wave plate 320 and lens 310.

While first components 116 and rotated components 118 are shown as traveling along two separate paths, in practice, first components 116 and rotated components 118 may travel along the same path. For example, mirror 330 may receive rotated components 118 (e.g., based on wave plate 320 rotating first components 116), and reflect rotated components 118 along the same path as first components 116. Alternatively, mirror 310 may reflect rotated components 118 along some other path.

Figure 4:
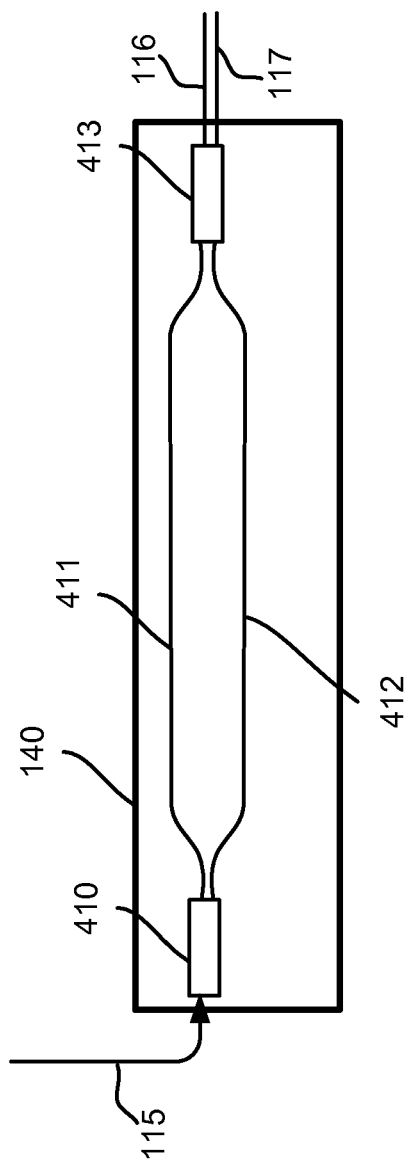
FIG. 4 is a diagram illustrating example components of a PBS as shown in FIG. 1.

FIG. 4 is a diagram illustrating example elements of PBS 140 as shown in FIGS. 1A-1B. In practice, PBS 140 may include additional, fewer, or differently arranged elements than are shown in FIG. 4. PBS 140 may include splitter 410, waveguide 411, waveguide 412, and coupler 413.

In some implementations, splitter 410 may include a 3-dB power splitter device, or some other type of splitter device. Splitter 410 may receive an input signal (e.g., optical signal 125), and split the input signal (e.g., to form an asymmetric Mach-Zehnder interferometer) into output optical signals along waveguides 411 and 412.

Waveguides 411 and 412 may each include an optical link, or some other link, to transmit a respective optical signal supplied by splitter 410. In some implementations, waveguide 411 may supply an optical signal associated with first components 116. Waveguide 412 may supply an optical signal associated with second components 117.

Coupler 413 may include a 3-dB power coupler, or some other type of coupler. In some implementations, coupler 413 may filter components, associated with waveguides 411 and 412, having an undesired polarization. For example, assume that waveguide 411 supplies an optical signal associated with first components 116 and that first components 116 have the first polarization. Coupler 413 may filter components supplied by waveguide 411 having the second polarization. Further assume that waveguide 412 supplies an optical signal associated with second components 117 and that second components 117 have the second polarization. Coupler 413 may filter components supplied by waveguide 412 having the first polarization.

Figure 5:
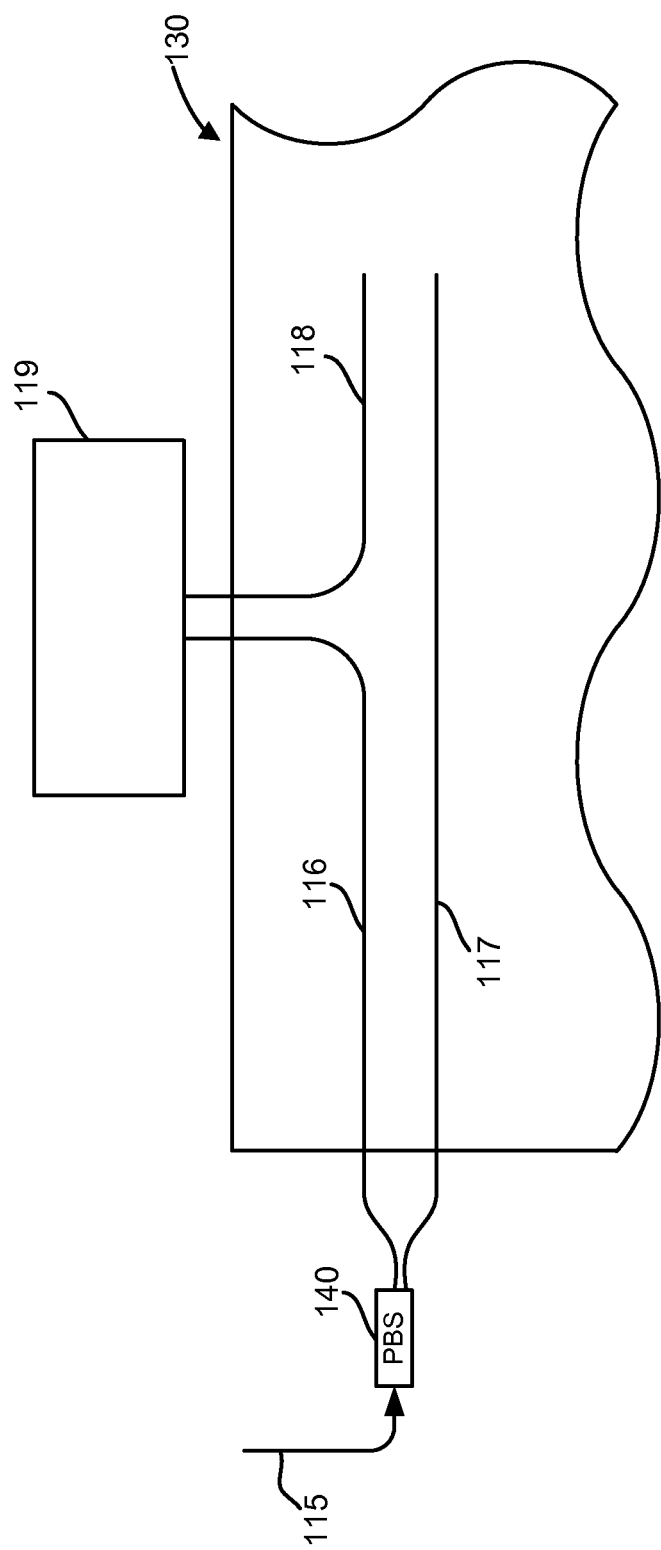
FIGS. 5-7 are diagrams illustrating example implementations as described herein.

FIG. 5 is a diagram illustrating an example implementation described herein. In some implementations, elements shown in FIG. 5 may correspond to elements of network 100. In practice, the example implementation of FIG. 5 may include additional, fewer, or differently arranged components than are shown in FIG. 5.

As shown in FIG. 5, PBS 140 may receive an input signal, such as optical signal 125. As described above, PBS 140 may supply first components 116 associated with a first polarization (e.g., the TM polarization) and/or second components 117 associated with a second polarization (e.g., the TE polarization). In some implementations, and as shown in FIG. 5, first components 116 may be provided on a first path, and second components 117 may be provided on a second path. Additionally, the first path and the second path may be provided on a substrate of receiver module 150. Rotator 119 may receive first components 116 and may rotate the polarization associated with first components 116 (e.g., to form rotated components 118). Rotator 119 may supply rotated components 118 along a desired path (e.g., the first path or some other path).

Figure 6:
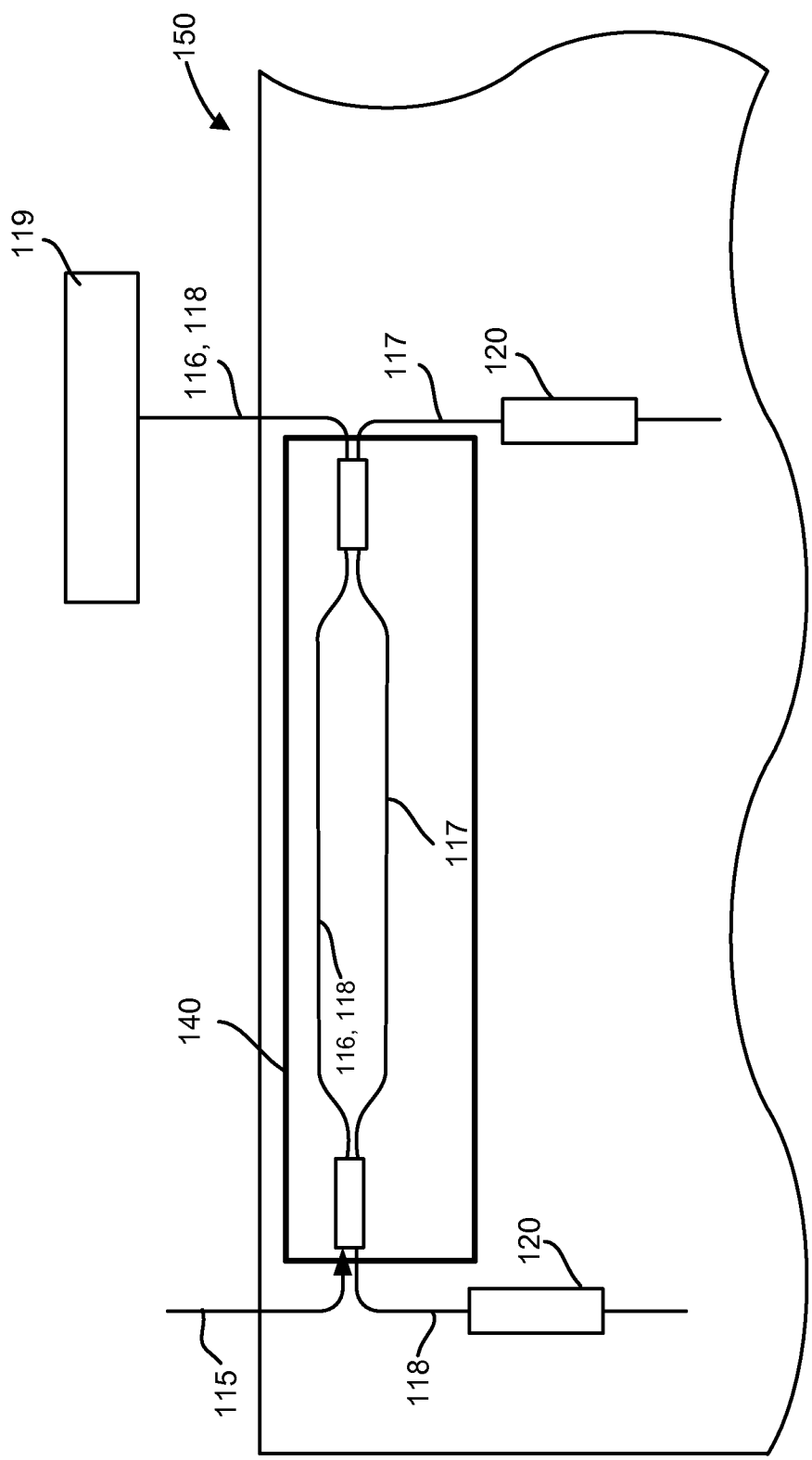

FIG. 6 is a diagram illustrating an example implementation described herein. In some implementations, elements shown in FIG. 6 may correspond to elements of network 100. In practice, the example implementation of FIG. 6 may include additional, fewer, or differently arranged components than are shown in FIG. 6.

As shown in FIG. 6, PBS 140 may be located on the substrate associated with receiver module 150 and may receive optical signal 125 (or some other signal). PBS 140 may supply first components 116 to rotator 119 along a first path (e.g., a path corresponding to rotated components 118) on the substrate of receiver module 150. Additionally, PBS 140 may supply second components 117, associated with a second polarization, along a second path (e.g., a path corresponding to second components 117) on the substrate of receiver module 150.

Rotator 119 may receive first components 116 supplied by PBS 140. Rotator 119 may supply rotated components 118, associated with the second polarization, along the first path (or some other path) on the substrate of receiver module 150.

In some implementations, and as shown in FIG. 6, a portion of the first path may include first components 116 and rotated components 118. For example, PBS 140 may provide first components 116 along the first path to rotator 119. Rotator 119 may rotate the polarization associated with first components 116 (e.g., to form rotated components 118), and may reflect rotated components 118 along the first path. In some implementations, the first path and the second path may be connected to optical demultiplexer 151, or some other device.

In some implementations, receiver module 150 may include one or more polarizers 120 to absorb components having an undesirable polarization. Polarizers 120 may include TE polarizers (e.g., to absorb components having the TM polarization) and/or TM polarizers (e.g., to absorb components having the TE polarization). For example, as shown in FIG. 6, polarizers 120 may be located on the first path and/or the second path and may absorb components associated with a particular polarization, such as the first polarization (e.g., a TE polarization) or the second polarization (e.g., a TM polarization). In some implementations, polarizers 120 may absorb residual components of rotated components 118 associated with the first polarization. For example, as described above rotator 119 may rotate first components 116, associated with the first polarization, to form rotated components 118 associated with the second polarization. Rotated components 118 may additionally include residual components associated with the first polarization. Polarizer 120 may be connected along the path associated with rotated components 118 to absorb the residual components associated with the first polarization, thereby absorbing components having an undesirable polarization.

Figure 7:
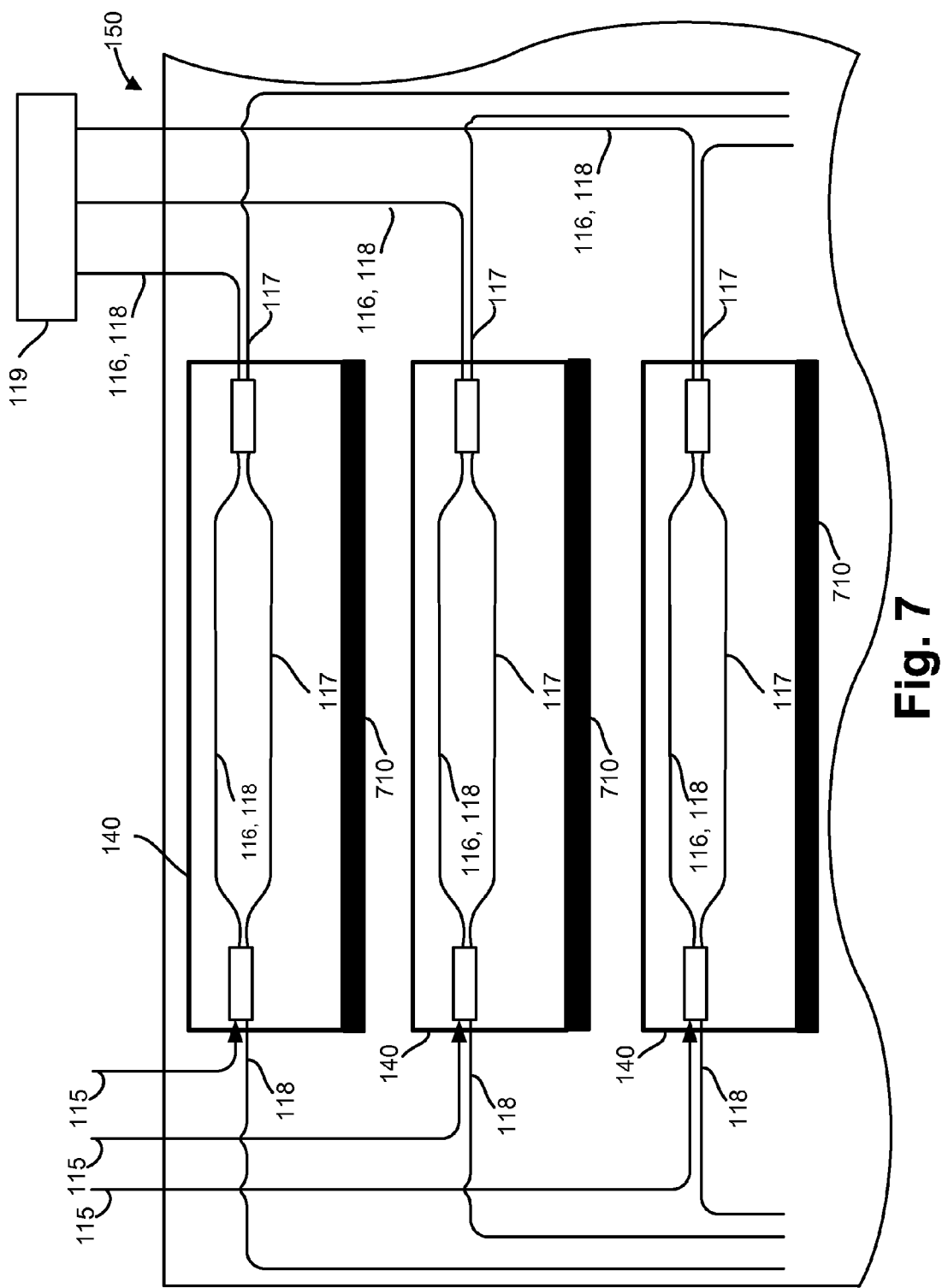

FIG. 7 is a diagram illustrating an example implementation described herein. In some implementations, components shown in FIG. 7 may correspond to components of network 100. In practice, the example implementation of FIG. 7 may include additional, fewer, or differently arranged components than what shown in FIG. 7.

As shown in FIG. 7, receiver module 150 may include multiple PBSs 140, such that each PBS 140 may receive a respective optical signal 125 or a respective portion of optical signal 125. Receiver module 150 may also include heaters 710 adjacent to PBSs 140. In some implementations, heaters 710 may adjust a temperature and the wavelengths associated with optical signal 125 to align wavelengths associated with optical signal 125 to PBS 140. Each PBS 140 may receive a respective optical signal 125 and supply respective first components 116 to rotator 119. Additionally, each PBS 140 may supply respective second components 117 to optical demultiplexer 151, a set of optical demultiplexers 151, or some other device.

Rotator 119 may be located separately or detached from receiver module 150 and may receive multiple first components 116 supplied by multiple PBSs 140. Rotator 119 may provide multiple rotated components 118 corresponding to the multiple first components 116. In some implementations, rotator 119 may supply the multiple rotated components 118 to optical demultiplexer(s) 151.

While an example shown in FIG. 7 describes an implementation with 3 input signals (i.e., 3 WDM signals 125), corresponding to 3 PBSs 140, and corresponding to 3 pairs of outputs associated with PBS 140, in practice, any number of WDM signals 125 with corresponding PBSs 140 and corresponding pairs of outputs with PBS 140 may be implemented.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:
1. An optical system comprising:
a polarization beam splitter comprising:
an input that receives a plurality of optical signals, each of the plurality of optical signals comprising a corresponding one of a plurality of wavelengths;
first and second outputs,
the first output providing first components of the plurality of optical signals, each of the first components having a respective one of the plurality of wavelengths, and each of the first components having a first polarization, and the second output providing second components of the plurality of optical signals, each of the second components having a respective one of the plurality of wavelengths, and each of the second components having a second polarization;
a rotator comprising:
an input that receives the first components,
the rotator being configured to rotate the first polarization such that each of the first components has the second polarization, the rotator outputting the first components as rotated components; and
an optical circuit including:
a substrate, the rotator being separate from the substrate;
first and second paths provided on the substrate, the first path receiving the rotated components and the second path receiving the second components; and
an optical demultiplexer circuit provided on the substrate,
the first path providing the rotated components to the optical demultiplexer circuit, and
the second path providing the second components to the optical demultiplexer circuit,
the optical demultiplexer circuit comprising:
a plurality of outputs, each of first ones of the plurality of outputs supplying a respective one of the rotated components, and
each of second ones of the plurality of outputs supplying a respective one of the second components.

2. The optical system of claim 1, further comprising: a photodiode circuit on the substrate, the photodiode circuit configured to receive one of the rotated components or one of the second components, outputted by the optical demultiplexer circuit, to supply a corresponding electrical signal.

3. The optical system of claim 1, further comprising:
at least one heater located on the substrate adjacent to the polarization beam splitter, the heater configured to adjust a temperature of the polarization beam splitter.

4. The optical system of claim 1, where the first polarization is a Transverse Magnetic (TM) polarization and the second polarization is a Transverse Electric (TE) polarization.

5. The optical system of claim 1, where the first polarization is a Transverse Electric (TE) polarization and the second polarization is a Transverse Magnetic (TM) polarization.

6. The optical system of claim 1, where, when rotating the first polarization, the rotator is further configured to output a residual first polarization;
the optical circuit further comprising:
a polarizer on the substrate, the polarizer configured to absorb the residual first polarization.

7. The optical system of claim 1, where the rotator comprises:
a quarter-wave plate configured to rotate the first polarization such that each of the first components has the second polarization; and
a mirror to output the components as the rotated components along the first path.

8. The optical system of claim 7, where the rotator further comprises: a collimating lens configured to prevent the rotated components from diverging.

9. The optical system of claim 8, where the quarter-wave plate is made from a birefringent material.

10. The optical system of claim 1, where the polarization beam splitter is one of a plurality of polarization beam splitters that have a plurality of first and second outputs.

11. The optical system of claim 1, where the optical demultiplexer circuit includes an arrayed waveguide grating.

12. The optical system of claim 1, where the optical demultiplexer circuit includes first and second arrayed waveguide gratings, the first arrayed waveguide grating connected to the first path to receive the rotated components and the second arrayed waveguide grating connected to the second path to receive the second components.

13. The optical system of claim 1, where the polarization beam splitter is located on the substrate of the optical circuit.

14. The optical system of claim 1, where the polarization beam splitter is separate from the optical circuit and the rotator.

15. An optical system comprising:
a plurality of polarization beam splitters, each of the plurality of polarization beam splitters comprising:
an input that receives a plurality of optical signals, each of the plurality of optical signals comprising a corresponding one of a plurality of wavelengths;
first and second outputs,
the first output providing first components of the plurality of optical signals, each of the first components having a first polarization, and
the second output providing second components of the plurality of optical signals, each of the second components having a second polarization;
a rotator comprising:
a plurality of inputs, each of the plurality of inputs receiving a plurality of the first components,
the rotator being configured to rotate the first polarization such that each of the first components has the second polarization, and output the first components as rotated components; and
an optical circuit comprising:
a substrate, the rotator being separate from the substrate;
a plurality of first and second paths provided on the substrate, the plurality of the first paths receiving a respective one of the rotated components and each of the plurality of the second paths receiving a respective one of the second components; and
an optical demultiplexer circuit provided on the substrate,
the plurality of the first paths providing the rotated components to the optical demultiplexer circuit, and
the plurality of the second paths providing the second components to the optical demultiplexer circuit,
the optical demultiplexer circuit comprising:
a plurality of outputs, each of first ones of the plurality of outputs supplying a respective one of the rotated components, and
each of second ones of the plurality of outputs supplying a respective one of the second components.

16. The optical system of claim 15, further comprising: a photodiode circuit on the substrate, the photodiode circuit configured to receive one of the rotated components or one of the components, outputted by the optical demultiplexer circuit to supply a corresponding electrical signal.

17. The optical system of claim 15, where the first polarization is a Transverse Magnetic (TM) polarization and the second polarization is a Transverse Electric (TE) polarization.

18. The optical system of claim 15, where the first polarization is a Transverse Electric (TE) polarization and the second polarization is a Transverse Magnetic (TM) polarization.

19. The optical system of claim 15, where, when rotating the first polarization, the rotator is further configured to output a residual first polarization;

the optical circuit further comprising:
  a polarizer on the substrate, the polarizer configured to absorb the residual first polarization.

20. The optical system of claim 15, where the rotator comprises:
  a quarter-wave plate configured to rotate the first polarization such that each of the first components has the second polarization; and
  a mirror to output the first components as the rotated components along the first path.

21. The optical system of claim 20, where the rotator further comprises: a collimating lens configured to prevent the rotated components from diverging.

22. The optical system of claim 20, where the quarter-wave plate is made from a birefringent material.

23. The optical system of claim 15, where the optical demultiplexer circuit includes an arrayed waveguide grating.

24. The optical system of claim 15, where the optical demultiplexer circuit includes first and second arrayed wave guide gratings, the first arrayed wave guide grating connected to the first path to receive the rotated components and the second arrayed wave guide grating connected to the second path to receive the second components.

25. The optical system of claim 15, where the plurality of polarization beam splitters are located on the substrate of the optical circuit.

26. The optical system of claim 15, where the plurality of polarization beam splitters are separate from the optical circuit and the rotator.

27. The optical system of claim 15, further comprising:
  at least one heater located on the substrate adjacent to the polarization beam splitter, the heater configured to adjust a temperature and the plurality of wavelengths associated with the plurality of optical signals to align the polarization beam splitter to the plurality of wavelengths associated with the plurality of optical signals.

* * * * *